(12) United States Patent
Gourlay

(10) Patent No.: US 8,467,013 B2
(45) Date of Patent: Jun. 18, 2013

(54) LIGHT GUIDES

(75) Inventor: James Gourlay, Livingston (GB)

(73) Assignee: ITI Scotland Limited, Livingston (GB)

( * ) Notice: Subject to any disclaimer, the term of this patent is extended or adjusted under 35 U.S.C. 154(b) by 275 days.

(21) Appl. No.: 12/744,644

(22) PCT Filed: Nov. 25, 2008

(86) PCT No.: PCT/GB2008/003928
§ 371 (c)(1),
(2), (4) Date: Aug. 10, 2010

(87) PCT Pub. No.: WO2009/068860
PCT Pub. Date: Jun. 4, 2009

(65) Prior Publication Data
US 2010/0328574 A1 Dec. 30, 2010

(30) Foreign Application Priority Data
Nov. 26, 2007 (GB) .................................. 0723166.5

(51) Int. Cl.
*G02F 1/1335* (2006.01)
*F21V 7/04* (2006.01)
(52) U.S. Cl.
USPC ................. 349/64; 349/67; 362/607; 362/613
(58) Field of Classification Search
USPC ................ 349/62, 64, 67; 362/606, 607, 612, 362/613, 618, 623, 624
See application file for complete search history.

(56) References Cited

U.S. PATENT DOCUMENTS

| | | | |
|---|---|---|---|
| 6,337,946 B1 | 1/2002 | McGaffigan | 385/901 |
| 6,561,663 B2* | 5/2003 | Adachi et al. | 362/616 |
| 6,969,189 B2* | 11/2005 | Lee et al. | 362/631 |
| 7,287,891 B1* | 10/2007 | Park et al. | 362/555 |
| 7,663,804 B2* | 2/2010 | Chang | 359/599 |
| 7,791,683 B2* | 9/2010 | Larson et al. | 349/62 |
| 8,128,272 B2* | 3/2012 | Fine et al. | 362/606 |
| 8,393,748 B2* | 3/2013 | Herrmann et al. | 362/97.3 |
| 8,393,775 B2* | 3/2013 | Kim et al. | 362/613 |

(Continued)

FOREIGN PATENT DOCUMENTS

| | | |
|---|---|---|
| EP | 1860919 | 11/2007 |
| JP | 2004 241282 | 8/2004 |

(Continued)

OTHER PUBLICATIONS

International Search Report and Written Opinion, and International Preliminary Report on Patentability from PCT Application PCT/GB2008/003928.

(Continued)

*Primary Examiner* — Edward Glick
*Assistant Examiner* — Dennis Y Kim
(74) *Attorney, Agent, or Firm* — Harness, Dickey & Pierce, P.L.C.; J. Timothy Keane; Kisuk Lee

(57) ABSTRACT

This invention relates to a light guide device and methods of manufacture. The light guide device is suitable for use in a range of applications, particularly in connection with the backlighting of displays, for example, liquid crystal displays. The light guide device comprises a combination of guide layers and one or more scattering structures in order to mask the appearance of one or more light sources.

17 Claims, 1 Drawing Sheet

U.S. PATENT DOCUMENTS

| | | | |
|---|---|---|---|
| 2002/0008807 A1 | 1/2002 | Miyatake et al. | 349/65 |
| 2003/0016314 A1* | 1/2003 | Dong et al. | 349/65 |
| 2005/0265029 A1* | 12/2005 | Epstein et al. | 362/339 |
| 2006/0002146 A1* | 1/2006 | Baba | 362/613 |
| 2006/0083019 A1 | 4/2006 | Hahm et al. | 362/555 |
| 2006/0087827 A1 | 4/2006 | Jung et al. | 362/29 |
| 2006/0092663 A1 | 5/2006 | Noh et al. | 362/608 |
| 2006/0256255 A1* | 11/2006 | Minami | 349/65 |
| 2007/0081339 A1* | 4/2007 | Chung et al. | 362/294 |
| 2007/0086179 A1* | 4/2007 | Chen et al. | 362/27 |
| 2007/0147073 A1* | 6/2007 | Sakai et al. | 362/607 |
| 2008/0007541 A1* | 1/2008 | Eliasson et al. | 345/176 |
| 2011/0051037 A1* | 3/2011 | Kim et al. | 349/62 |

FOREIGN PATENT DOCUMENTS

| | | |
|---|---|---|
| WO | WO 2005/107363 | 11/2005 |
| WO | WO 2006/126155 | 11/2006 |
| WO | WO 2008/061059 | 3/2008 |
| WO | WO 2008/038728 | 5/2008 |

OTHER PUBLICATIONS

UK International Search Report in Application No. GB 0723166.5, dated Mar. 20, 2008.

UK International Examination Report in Application No. GB 0723166.5, dated Oct. 27, 2008.

* cited by examiner

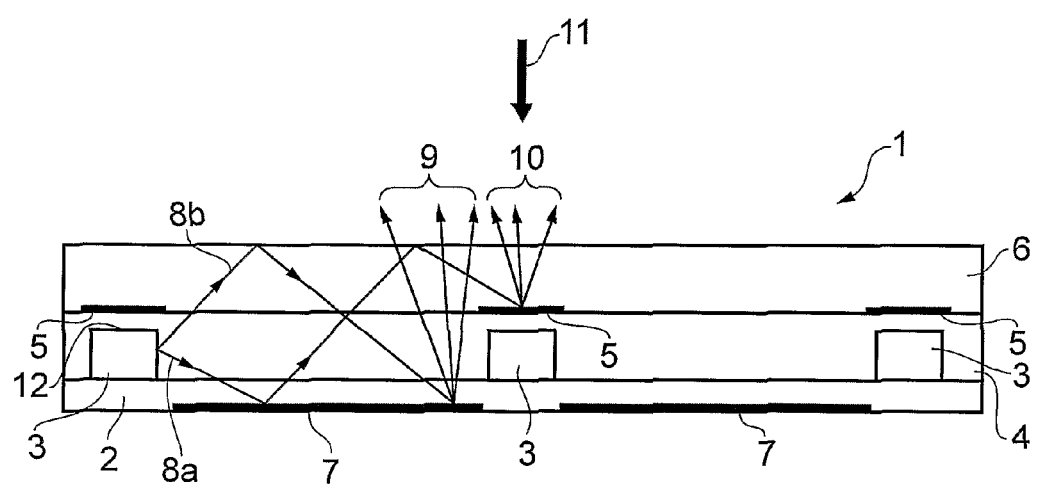

LIGHT GUIDES

CROSS REFERENCE TO RELATED APPLICATION

This application is a 371 of PCT International Application No. PCT/GB2008/003928 filed Nov. 25, 2008 (Publication No. WO 2009/068860), which claims priority to GB Patent Application No. 0723166.5, filed Nov. 26, 2007. The disclosures of the above applications are incorporated herein by reference in their entirety.

FIELD OF THE INVENTION

This invention relates to a light guide device and methods of manufacture. The light guide device is suitable for use in a range of applications, particularly in connection with the backlighting of displays, for example, liquid crystal displays.

BACKGROUND OF THE INVENTION

A number of light guiding devices are known. These devices are employed for a range of functions including illumination, backlighting, signage and display purposes. Typically, the devices are constructed from an injection moulded or machined transparent plastic component, where a light source, such as a fluorescent lamp or a plurality of light emitting diodes (LEDs), is integrated by means of mechanical attachment at the edge of the transparent plastic component.

Common to all of these devices is the fact that light from the light source is guided through a transparent guide, typically made of plastic, by total internal reflection. For backlighting applications, light is emitted in a substantially perpendicular direction to that of the direction of propagation of the light within the transparent guide. This is achieved through the light being directed so as to interact with scattering structures or films located within, or on the surface of, the transparent guide.

The integration of fluorescent lamps or LEDs to the edge of the transparent light guide is not a straightforward process and thus significantly increases the complexity of the production process for these devices. Achieving a good coupling is essential to the optical performance of the device. In addition, edge coupling of the light sources renders these components susceptible to mechanical damage during both the production process and the normal use of the device.

In seeking to provide thin direct lit backlights, it is preferable to have light emitted into the plane of the light guide. Further benefit may be obtained if the light sources are distributed across the panel, so minimising the length of guiding in the light guide. This has the benefit of creating a thin and efficient backlight but has the disadvantage of creating dark spots above the light source. Preferably, these dark spots should not be visible or, at least, reduced. Existing solutions to this problem tend to add considerable thickness to the backlight.

It is an object of the present invention to provide a light guiding device that addresses one or more of the aforesaid disadvantages.

SUMMARY OF THE INVENTION

In a first aspect of the present invention, there is provided a light guide device comprising a base substrate having a first refractive index, upon a first surface of which are mounted one or more light sources and a first guide layer having a second refractive index that is less than or equal to the first refractive index, the first guide layer being arranged so as to encapsulate the one or more light sources upon the first surface, wherein upon the first guide layer is mounted a second guide layer having a third refractive index that is equal to or greater than the first guide layer and at the interface between the first and second guide layer and above the one or more sources of light is located one or more reflective light scattering structures, wherein the base substrate and the guide layers form a composite structure for guiding light produced by the one or more light sources over the first surface and said one or more light scattering structures masks the appearance of the one or more sources of light.

The light guide device may further comprise one or more reflecting scattering structures arranged so as to direct light away from the first surface. For example, the one or more further scattering structures may be located on a second surface of the base substrate which is opposite to the first surface.

According to a second aspect of the present invention, there is provided a method of producing a light guide device, the method comprising:
i. mounting one or more light sources onto a first surface of a base substrate having a first refractive index; and
ii. adding a first guide layer, having a second refractive index that is less than or equal to the first refractive index, to the first surface so as to encapsulate the one or more light sources upon the first surface;
iii. adding a second guide layer, having a third refractive index that is equal to or greater than the first guide layer, to the first guide layer;
iv. applying one or more scattering structures on the first guide layer and/or the second guide layer, before the second guide layer is added, such that said one or more scattering structures are located at the interface between said first and second guide layers and above the one or more sources of light.

In the method according to the second aspect of the invention, the one or more scattering structures may be added to the first guide layer before or after the first guide layer is added.

The method according to the second aspect of the invention provides a means for guiding light produced by the one or more light sources over the first surface.

Preferably, the method of adding the first guide layer to the first surface of the base substrate and/or mounting the second guide layer onto the first guide layer comprises:
i. applying a liquid polymer on the first surface and/or first guide layer; and
ii. curing the liquid polymer on the first surface and/or first guide layer.

The method of applying the liquid polymer on the first surface and/or the first guide layer may comprise printing, stencilling or dispensing the liquid polymer.

Optionally, the method further comprises the step of applying one or more scattering structures on the light guide device arranged so as to redirect light away from the first surface. The application of the one or more scattering structures may comprise printing a patterned, reflecting ink layer.

The arrangement of the guide layers in relation to the light sources provides a light guiding device that exhibits enhanced mechanical protection for the light sources. Furthermore, a device is provided that is simple to produce and which exhibits enhanced optical coupling of the light within the device. With the refractive index of the base substrate and the second guide layer selected to be equal to or higher than that of the first guide layer, the generated light is guided within both the transparent base substrate and the guide layers due to the effects of total internal reflection.

According to a third aspect of the present invention, there is provided a display device comprising a light guiding device according to the first aspect of the invention. The display device may be a liquid crystal display device and may therefore comprise a liquid crystal cell which may also be referred to as a liquid crystal panel.

The base substrate and the first and second guide layers are light transmissive and preferably transparent to the light generated by the one or more light sources.

The present invention seeks to provide one or more of the following advantages: a more uniform light guide device with reduced/no dark spots when viewed in use; efficient light distribution resulting in lower power requirements; a thinner, lighter structure; a device comprising a reduced number of system components.

DETAILED DESCRIPTION OF THE INVENTION

Base Substrate

The base substrate may be formed from a transparent polymer sheet such as polyester or polycarbonate. The thickness of the transparent base substrate is typically of the order of about 0.1 mm, for example in the range of about 0.1 mm to about 0.2 mm. The refractive index of the base substrate is typically greater than 1.5.

Light Sources

The light source can be any of those known to those skilled in the art, including those which are suitable for use in backlighting. Such light sources include one or more LEDs. The light may be non-directional. The LEDs can be any of the designs known to those skilled in the art, including edge-emitting, side emitting, top emitting or bare die LEDs.

Typically an LED suitable for use in the present invention is of the order of about 1 mm in each dimension.

Electrical tracks may be patterned onto the transparent base substrate, so forming electrical bonding pads for the one or more light sources and electrical connections for external electrical driving equipment. The electrical tracks may be patterned by etching methods, for example, using copper or gold, or by additive screen printing methods, for example, using silver loaded adhesive.

The LED light sources may be electrically and mechanically attached to the electrical bonding pads by soldering or conducting adhesive methods.

Guide Layers

The guide layers (which may also be referred to as light guide layers) which are typically suitable for use in a backlight unit may comprise a transparent flexible plastic polymer layer, typically of about 1 mm in thickness.

The refractive indices of the first and second guide layers may be substantially the same or the refractive index of the second guide layer may be higher than the first guide layer. For the situation where the second light guide layer has a higher refractive index, the difference in refractive indices may be as high as about 10%.

The guide layers may be made from a range of available polymers, including acrylics, urethanes or polycarbonates.

The guide layers may be combined using a standard lamination technique. Such a technique may require the use of a transparent adhesive which has a refractive index which is higher than both the first and second guide layers. The guide layers may be optically joined during manufacture. The method of combining the layers may comprise applying and curing a liquid polymer layer. Methods of curing may make use of one or more techniques including UV, thermal or two-part curing. The method may comprise printing, stencilling or dispensing the liquid polymer. Optically joined indicates the layers are combined in such a way that, optically, these layers are effectively indistinguishable. This technique may also be used for combining the first guide layer and the base substrate.

Light Scattering Structures

The light scattering structures are reflective and disturb the total internal reflection of the guided light. The application of the scattering structure or structures may be accomplished using standard printing, micromoulding, microstamping and microembossing techniques. Suitable scattering features include highly reflective white printed ink dots. In such an arrangement, each dot disturbs the total internal reflection of the guided light and causes the light to be scattered randomly and to escape from the light guide. The size and/or pitch of the dots may be varied to ensure uniform light scatter.

The ink, which may be a polymeric material, may be applied to at least one of the guide layers to form a thin pattern of features, according to any of a number of methods and may be referred to in general terms as an additive printing process. For example, conventional screen printing incorporates the use of a mesh screen with openings corresponding to the pattern required to be printed. This pattern facilitates the accurate delivery of a volume of ink to the required areas of the guide layer. Suitable inks for use in the present invention include those which may be UV or solvent cured. Other suitable examples of additive printing methods include stencil printing, ink jet printing, flexographic printing and other known lithographic techniques. The ink may be applied in varying amounts and shapes.

Other scattering structures include microstructured surfaces which comprise a plurality of three dimensional features, or irregularities, which are proud of the surface and arranged on a scale of about 1 to about 1000 microns, independently, in width, depth and pitch, preferably about 5 to about 50 microns, more preferably about 20 to about 50 microns. Specific types of microstructures, or features, which are suitable for use in the present invention include prisms, pyramids, (micro)lenses, e.g. cylindrical or circular shaped lenses and random diffusing structures.

Prism based microstructures may have a saw tooth shape structure varying in one direction across the entirety of the surface with a pitch of about 50 microns, wherein the pitch is the distance between the centre of adjacent microstructures. (Micro)lenses have a regular or random distribution of lenses, which may be of a low focal length, distributed across the surface on a scale of about 10 to 20 microns. The diffusing structures may possess a random surface texture which is also on a scale (depth and pitch) of about 10 to 100 microns.

The light scattering features may also be referred to as light extraction features.

Uses of the Light Guide Devices

The light guide device according to the present invention may be employed for a range of functions including illumination, backlighting, signage and display purposes.

Liquid crystal devices are well known in the art. A liquid crystal display device operating in a transmissive mode typically comprises a liquid crystal cell, which may also be referred to as a liquid crystal panel, a backlight unit incorporating a light guide device, and one or more polarisers. Liquid crystal cells are also well known devices. In general, liquid crystal cells typically comprise two transparent substrates between which is disposed a layer of liquid crystal material. A liquid crystal display cell may comprise two transparent plates which may be coated on their internal faces respectively with transparent conducting electrodes. An alignment layer may be introduced onto the internal faces of the cell in order that the molecules making up the liquid crystalline material line up in a preferred direction. The transparent plates are separated by a spacer to a suitable distance, for example about 2 microns. The liquid crystal material is introduced between the transparent plates by filling the space in between them by flow filling. Polarisers may be arranged in front of and behind the cell. The backlight unit may be positioned behind the liquid crystal cell using conventional means. In operation, a liquid crystal cell, operating in a transmissive mode, modulates the light from a light source such as a backlight unit which may comprise a light guide device.

BRIEF DESCRIPTION OF THE DRAWINGS

Embodiments of the invention will now be described, by way of example only and without limitation, with reference to the accompanying drawing and the following Example, in which FIG. 1 illustrates a light guide device according to the present invention.

In FIG. 1, a light guide device (1) in side elevation comprises a transparent base substrate (2) made from a transparent polymer sheet such as polyester or polycarbonate and having a refractive index n2. On top of the transparent base substrate (2) are bonded a number of light sources (3) in the form of LEDs. The distance between the LEDs is typically about 10 mm to about 200 mm. Covering the LEDs and the remaining area of the top surface of the transparent base substrate (2) is a first transparent guide layer (4) also formed from a plastic polymer and having a refractive index n4. Located on the lower surface of the transparent base substrate is a scattering structure (7) in the form of a patterned reflecting ink layer. Located on the upper surface of the first transparent guide layer is a second transparent guide layer (6) having a refractive index n6.

At the perimeter interface between the transparent base substrate (2) and the first transparent guide layer (4), a cavity layer structure (not shown) may be incorporated in order to from a suitable cavity in which the LEDs (3) may be embedded.

The refractive indices of the transparent base substrate and the first transparent guide layer are such that they satisfy the inequality n2>n4. The refractive indices of the second transparent guide layer and the first transparent guide layer are such that they satisfy the inequality n6≧n4. As a result, and as can be seen from FIG. 1, light, indicated by (8a and 8b), generated by the LED light source is initially coupled into the transparent guide layers so as to propagate in a direction substantially parallel to a plane defined by the transparent base substrate. With the refractive index of the transparent base substrate and the second transparent guide layer selected to be equal or higher than that of the first transparent guide layer, the generated light is guided within both the transparent base substrate and the transparent guide layers due to the effects of total internal reflection. Therefore, the transparent base substrate and the transparent guide layers form a composite structure that acts as the guiding media for the light generated by the encapsulated LED light sources (3).

When the light (8a, 8b) has propagated as far as the scattering structure (7), it interacts with this structure so as to be redirected and so exit the device via the top surface of the transparent guide layer, either directly—indicated at (9) or via the reflective scattering structure (5)—indicated at (10), so providing a backlighting function.

The scattering structure (5) is located at the interface between the first and second transparent guide layers and over the LEDs such that the scattering effects of the scattering structure (5), and the scattering structure (7) reduce or remove completely the dark appearance of the top surface, indicated at (12), of the LEDs. The second or upper guide layer is providing uniform light distribution across the complete area eliminating or reducing any dark spots whilst retaining a thin overall structure.

In use, and when incorporated into a suitable device such as a liquid crystal display, the light guide device illustrated is viewed substantially in the direction indicated at (11).

The scattering structures (5) and (7) may comprise highly reflective white ink dots. Both the dot size and/or pitch may be varied in order to fine tune the scattering effects.

As a result of the fact that there is no air gap between the output of the light sources and the light guiding media, the transparent guide layers provide a simpler, and enhanced means of optically coupling the light within the device.

EXAMPLES

Example 1

A device in accordance with the invention was constructed as follows. A 0.125 mm thick sheet of transparent polyester was used as a base substrate. A scattering structure comprising white lines of ink was printed onto the underside of the polyester film. The ink used was a white acrylic based, UV curing polymer screen printable ink which is commercially available. On the opposite (or top) side of the polyester film was printed conducting tracks (silver particle loaded conducting epoxy) and conducting adhesive in order to mount a number of LEDs (Stanley Tw1145ls-tr) onto the substrate and provide suitable electrical connections onto the conducting ink tracks. A cavity, about 0.7 mm deep was formed around the perimeter of the base substrate using a cavity layer structure. The cavity was then filled with UV curing transparent polymer (Dymax 4-20688), thus forming a first light guide layer. The second light guide layer was formed by placing on top of the first light guide layer a 0.75 mm thick sheet of acrylic based polymer (Plexiglass 99524, commercially available from Degussa in Germany), which possessed a second scattering feature (white ink lines) printed on the underside arranged to line up with the LEDs. The UV curing transparent polymer was then cured, forming a solid mechanical structure between the polyester film, first light guide layer and second light guide layer and a continuous optical structure. The LEDs were concealed from observation from above, by the light scattering features on the underside of the second light guide layer.

Good uniformity of light was observed from the light extracted by the scattering features on the underside of the polyester film combined with the light extracted by the scattering features on the underside of the second light guide layer.

The invention claimed is:

1. A light guide device comprising:
a base substrate having a first refractive index, upon a first surface of which are mounted one or more light sources and
a first guide layer having a second refractive index that is less than or equal to the first refractive index, the first guide layer being arranged so as to encapsulate the one or more light sources upon the first surface,
wherein upon the first guide layer is mounted a second guide layer having a third refractive index that is equal to or greater than the first guide layer,
wherein at the interface between the first and second guide layers and above the one or more light sources is located one or more reflective light scattering structures, wherein the base substrate and the guide layers form a composite structure for guiding light produced by the one or more light sources over the first surface, and wherein said one or more reflective light scattering structures mask the appearance of the one or more light sources, wherein the light guide device comprises one or more further reflecting light scattering structures arranged so as to direct light away from the first surface of the base substrate, and wherein the one or more further reflecting light scattering structures are located on a second surface of the base substrate which is opposite to the first surface.

2. The light guide device according to claim 1, wherein the base substrate is formed from a transparent polymer sheet.

3. The light guide device according to claim 1, wherein the base substrate is about 0.1 mm thick.

4. The light guide device according to claim 1, wherein the light source comprises one or more LEDs.

5. The light guide device according to claim 1, wherein the first and second guide layers are formed from a transparent flexible polymer.

6. The light guide device according to claim 1, wherein the first and second guide layers are about 1 mm thick.

7. The light guide device according to claim 1, wherein the one or more reflective light scattering structures and/or the one or more further reflecting light scattering structures comprise microstructured surfaces.

8. The light guide device according to claim 7, wherein the microstructured surfaces comprise a plurality of three dimensional features which are part of the surface.

9. The light guide device according to claim 8, wherein the three dimensional features are arranged on a scale of about 1 to about 1000 microns independently selected in width, depth and pitch.

10. The light guide device according to claim 7, wherein the one or more reflective light scattering structures and/or the one or more further reflecting light scattering structures comprise dots of ink.

11. A display device comprising the light guide device according to claim 1.

12. The display device according to claim 11, wherein the display device comprises a liquid crystal cell.

13. The light guide device according to claim 1, wherein the one or more reflective light scattering structures and/or the one or more further reflecting light scattering structures comprise dots of ink.

14. A method of producing a light guide device, the method comprising:
  a. mounting one or more light sources onto a first surface of a base substrate having a first refractive index;
  b. adding a first guide layer, having a second refractive index that is less than or equal to the first refractive index, to the first surface so as to encapsulate the one or more light sources upon the first surface;
  c. adding a second guide layer, having a third refractive index that is equal to or greater than the first guide layer, to the first guide layer;
  d. applying one or more reflective light scattering structures on the first guide layer and/or the second guide layer, before the second guide layer is added, such that said one or more reflective light scattering structures are located at the interface between said first and second guide layers and above the one or more sources of light; and
  e. applying one or more further reflective light scattering structures on a second surface of the base substrate which is opposite the first surface so as to direct light away from the first surface.

15. The method according to claim 14, wherein the adding the first guide layer to the first surface of the base substrate and/or mounting the second guide layer onto the first guide layer comprises:
  applying a liquid polymer on the first surface and/or first guide layer; and
  curing the liquid polymer on the first surface and/or first guide layer.

16. The method according to claim 14, wherein the light source comprises one or more LEDs.

17. The method according to claim 14, further comprising combining said light guide device with a liquid crystal cell to form a liquid crystal display device.

* * * * *